United States Patent [19]
Oestreich

[11] Patent Number: 4,776,665
[45] Date of Patent: Oct. 11, 1988

[54] METAL-FREE, SELF-BEARING OPTICAL CABLE FOR HIGH-TENSION OVERHEAD LINES

[75] Inventor: Ulrich Oestreich, Munich, Fed. Rep. of Germany

[73] Assignee: Siemens Aktiengesellschaft, Berlin and Munich, Fed. Rep. of Germany

[21] Appl. No.: 886,830

[22] Filed: Jul. 18, 1986

[30] Foreign Application Priority Data

Aug. 12, 1985 [DE] Fed. Rep. of Germany ....... 3528927

[51] Int. Cl.[4] ................................................ G02B 6/44
[52] U.S. Cl. .............................. 350/96.23; 174/70 A; 174/102 SC; 174/105 SC; 174/106 SC; 174/120 SC
[58] Field of Search ............... 350/96.23, 96.34, 96.20, 350/96.21, 96.22; 428/373; 174/102 SC, 105 SC, 106 SC, 120 SC, 70 A

[56] References Cited

U.S. PATENT DOCUMENTS

| | | | |
|---|---|---|---|
| 3,935,042 | 1/1976 | Wahl | 174/120 SC X |
| 4,342,500 | 8/1982 | Oestreich et al. | 350/96.23 |
| 4,588,855 | 5/1986 | Kutsuwa et al. | 174/120 SC |
| 4,629,286 | 12/1986 | Fuse et al. | 350/96.23 |
| 4,662,712 | 5/1967 | Tabata et al. | 350/96.23 |

FOREIGN PATENT DOCUMENTS

| | | |
|---|---|---|
| 0112163 | 6/1984 | European Pat. Off. . |
| 3118172 | 11/1982 | Fed. Rep. of Germany ... 350/96.23 |

Primary Examiner—John Lee
Attorney, Agent, or Firm—Hill, Van Santen, Steadman & Simpson

[57] ABSTRACT

A metal free self-bearing optical cable is provided for use as an overhead cable in the field region between phase wires of a high-tension power line. The cable core is formed of slightly electrically conductive material having series resistances of between $10^5$ Ω cm and $10^{10}$ Ω cm.

17 Claims, 3 Drawing Sheets

METAL-FREE, SELF-BEARING OPTICAL CABLE FOR HIGH-TENSION OVERHEAD LINES

CROSS-REFERENCE TO CO-PENDING U.S. APPLICATION

A related co-pending U.S. patent application is Ser. No. 719,529, filed Apr. 3, 1985 (now U.S. Pat. No. 4,673,247).

BACKGROUND OF THE INVENTION

Field of the Invention

The present invention relates to a metal-free, self-bearing optical cable composed of a cable core and cable cladding for use as an overhead cable in the field region of phase wires of a high-tension overhead line.

Optical cables are frequently laid in the region of high-tension overhead lines in one of two fundamentally different arrangements. In the first configuration, the optical cables are integrated in or clipped to phase or guard wires. In the second configuration, the optical cables are constructed as self-bearing structures and are laid, or strung, in the field region, in other words, between or under the phase wires of a high-tension line. The fundamental structure of a self-bearing optical cable in the second configuration and the capacitive couplings derive therefrom are shown schematically in FIG. 1. A single phase high-tension overhead line HF is shown, wherein a metal-free, self-bearing optical cable OK is strung in the field region and is held by a cross arm TR of a lattice tower GM. A guard wire referenced ES and a phase wire referenced PS are also shown.

Since the optical cable OK is composed of insulating materials, the jacket surface of the optical cable OK can be simulated by an equivalent circuit diagram formed of series resistances RL. Shunt capacitances CE extend between the optical cable OK and the guard wires ES, as well as between the optical cable OK and ground ED. Equivalent capacitances CP extend between the optical cable OK and the phase wire PS.

The illustrated equivalent circuit diagram also applies by analogy to a multi-phase high-tension line, wherein all of the phase conductors are shown united in an equivalent phase conductor.

It has been shown that the claddings of "fully dielectric cables" can be damaged or destroyed due to partial discharge events as a result of voltages appearing at the cable cladding, particularly for high-tension networks, such as those greater than or equal to 110 kV. Using the equivalent circuit diagram of FIG. 1, the following explanation can be given: the cable surface is effected by humidity and deposits, such as dirt, having the surface resistance RL, and as a result, assumes a voltage defined by the shunt capacitances CE and the effective partial capacitances CP in equilibrium when at an adequate distance from the grounded towers GM. In a worst case, the surface voltage at the optical cable can equal up to 50% of the phase voltage. Part of the resulting charging current flows off in the direction of the grounded tower GM via the surface resistance RL. The flowing current causes arc-overs and tracking currents of sufficient magnitude to break down the material of the outside cladding of the optical cable OK as a result of nonuniform resistances in the humidity film or in the contamination deposits. Thus, all transition conditions between damp and dry surfaces and/or between more or less contaminated surfaces are particularly critical.

SUMMARY OF THE PRESENT INVENTION

An object of the present invention is to reduce and possibly avoid stressing of an optical cable as caused by tracking currents and arc-overs for metal-free cables of the type described above. This and other objects are achieved in accordance with the teachings of the present invention by providing a cable core formed of weakly electrically conductive material having a resistivity of between $10^5$ $\Omega$cm and $10^{10}$ $\Omega$cm.

As the result of incorporating weakly conductive elements in the region of the cable core, the hazardous nonuniform resistance at the surface of the optical cable is to a large extent capacitively ohmically bridged. Thus, arc-overs and tracking currents are sufficiently disabled or avoided to avoid the undesired breakdown or destruction of the material of the optical cable.

A preferred embodiment also includes weakly conductive elements in the cable cladding.

DESCRIPTION OF THE PREFERRED EMBODIMENTS

Figure 2:
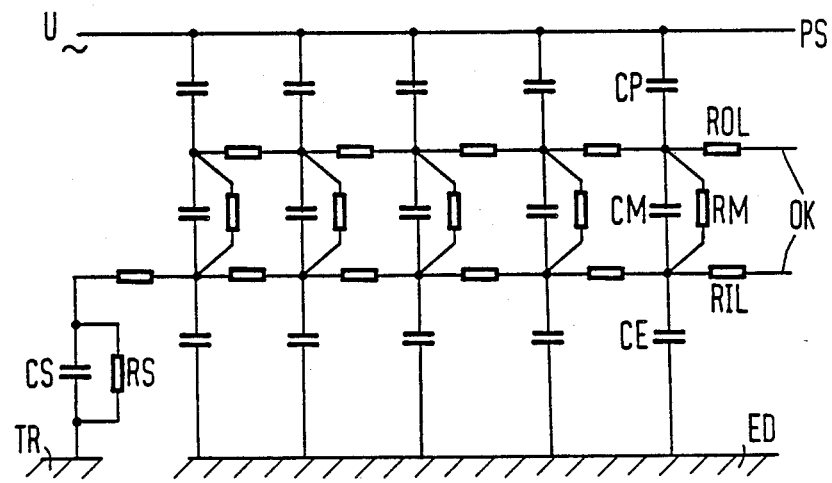
FIG. 2 is an equivalent circuit diagram of an optical cable of the present invention.
Figure 3:
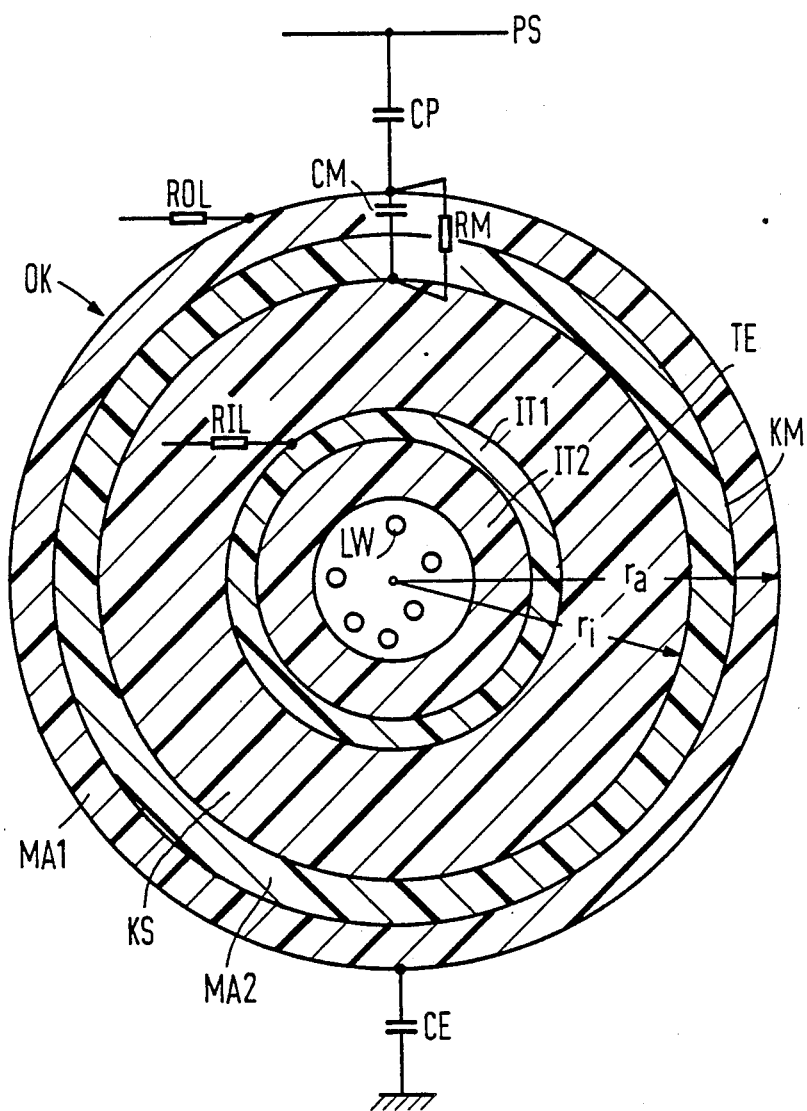
FIG. 3 is a lateral cross-section of the cable of the present invention.

In a self-bearing optical cable OK, an equivalent circuit diagram as shown in FIG. 2 is obtained when both cable cladding and cable core are formed of slightly electrically conductive materials according to the present invention. Equivalent resistances and capacitances, as shown in FIG. 3, are also obtained. In addition to shunt capacitances CP existing between the surface of cable cladding KM of the optical cable OK and the phase wire PS, and the shunt capacitances CE existing between the cable OK and the ground ED, yet another capacitance CM arises between the surface of the cable cladding KM and a cable core KS, as shown in FIG. 3. The capacitance CM, known as the cladding capacitance, is more than 100 times greater than the partial capacitances CP and CE as a result of the compact physical structure of the optical cable OK.

Surface resistances ROL on the cable cladding KM that are formed by the degree of contamination and dampness on an outside cladding layer MA1 of the cladding KM are potentialcontrolled in accordance with the present invention by an inside series resistance RIL formed by the slightly conductive cable core KS. The surface resistance ROL, also called the outside series resistance, depends in amplitude on the exterior condition of the cable cladding KM, and in fact does not become completely without effect. However, the surface resistances ROL have less effect the greater the cladding capacitance CM is and the smaller an appertaining bleeder resistance RM is. The bleeder resistance RM extends between the surface of the cable cladding KM, as symbolized by the series resistances ROL, and the cable core KS, as symbolized by the series resistances RIL. From FIG. 3, the resistance RM is the shunt resistance between the cylindrical outside surface of the cladding KM and the inside surface of the cladding KM. Thus, the following equation applies:

$$RM = (2 \cdot \pi \cdot 1)^{-1} \cdot \rho \cdot \ln \frac{r_a}{r_i}$$

where $r_a$ is the outside radius and $r_i$ is the inside radius of the cladding KM.

A numerical example is as follows:

A numerical example is as follows:

Inside diameter of cladding KM: 10 mm

Outside diameter of cladding KM: 12 mm

Dielectric constant of material ($\epsilon_r$): $\rho = 10^{12}$ Ωcm $$CM = \frac{2 \cdot \pi \cdot 8.86 \cdot 10^{-14} \cdot 3 \cdot 100}{\ln \frac{12}{10}} \left[ \frac{As}{Vcm} \cdot \frac{cm}{m} = \frac{F}{m} \right] =$$

$$9.2 \cdot 10^{-10} [F/m] = 920 [pF/m]$$

For standard dimensional structures, the capacitance CE is in the order of magnitude of only about 5 pF/m $$\frac{1}{\omega \cdot CM} = 3.5 \cdot 10^6 [\Omega \cdot m]$$

$$RM = \frac{\rho}{2 \cdot \pi \cdot 1} \cdot \ln \frac{r_a}{r_i} = \frac{10^{12}}{2 \cdot \pi \cdot 100} \cdot \ln 1.2 [\Omega \cdot m] =$$

$$2.9 \cdot 10^8 [\Omega \cdot m]$$

It can be seen that the cladding KM must become of extremely low impedance to significantly contribute to the overall shunt conductance. However, $\rho = 10^{10}$ Ω·cm can at most be achieved by a moisture-saturated fire resistant noncorrosive (FRNC) mixture. As such, the conductivity of the cladding KM is of subordinate significance.

The shunt resistance RM becomes all the smaller when the cladding KM is thinner and the specific insulation resistance of the cladding KM is lower. The complex shunt conductance of the cladding KM is $G = 1/RM + j \cdot \omega \cdot CM$.

The common effect of capacitance and insulating resistance is always decisive.

Whereas it was previously thought that fully dielectric cables in the region of ultra high-tension lines were to use optimally high insulating cable materials for the cable cladding and the cable core, the present invention is based on the perception that the insulatability of at least the cable core should be adapted to the cable surface. It should be carefully considered that a reduction of the insulatability results from contamination and moisture accumulation on the cable surface. As such, a grounded potential is in fact also established by the tower GM even for a dry cable surface, because the conductivity of the cable core KS is slow to adapt to the changing atmospheric humidity. However, no deterioration to the function of the cladding KM is caused. The cable core KM is grounded together with the cladding KM and then a current, generally of less than 1 mA, flows continuously through the cable OK to ground ED. However, the effect of the current can easily be reduced by proper grounding. Otherwise, a shock, although not dangerous, could occur when the cable core KS is touched, even under or near the tower GM.

As long as only the cable surface is conductive, the effect of the current is no longer present when the cable surface is dry. When, on the other hand, the cable core KS is conductive, a grounded current continues to flow even after the cladding surface has dried.

Therefore, it is expedient to use core and cladding materials which have a moderate insulating resistance. It is especially advantageous when this resistance is further reduced by the absorption of moisture. The reduction in resistance is useful because the series resistances ROL of the cladding KM are nonetheless still relatively high before the cable becomes dirty, whereby relatively high series resistances RIL of the core KS are likewise allowable. Only during the course of contamination do the cladding series resistances ROL become of a lower impedance, the core resistances RIL likewise becoming of a lower impedance simultaneously as a consequence of moisture absorption due to moisture constituents diffusing through the cable cladding KM into the interior of the cable OK.

Particularly advantageous for use as tightly packed core materials within the framework of the present invention are:

High-strength plastic filaments having an ionogenic surface;

High-strength glass filaments having an ionogenic surface;

Mixtures of both the high-strength plastic filaments and the high-strength glass filaments;

Plastic or glass filaments which are inadequately ionogeic in and of themselves but which are provided with an ionogenic slip;

Filaments of various types enhanced with swelling powder or an ionogenic coating.

The plastic filaments can be manufactured of polyamide, polyester, polycarbonate, etc., while the glass filaments can be manufactured of E-glass or S-glass.

In all of the above materials, the resulting insulating resistances should preferably be moisture-dependent to achieve an automatic, although correspondingly delayed, adaptation to climactic conditions, the insulating resistances being between $10^5$ and $10^{10}$ Ωcm depending on moisture absorption. It is thereby assured that, for example, an optical cable laid in a desert climate does not experience any damage due to partial discharges because no moisture deposits and no contamination occur at the outside surface, in other words, the surface resistance ROL values shown in FIG. 2 remain high. Furthermore, no increase in resistance occurs in the inside of the cable either since the series resistance RIL values do not decrease since there is a lack of humidity. The resulting cable series resistances ROL then lie between $10^7$ and $10^{12}$ Ω/m.

The following are particularly useful as cladding materials. For the inside cladding (layer MA2):
  Polyamides;
  Polyurethane;
  PVC (highly filled with kaolin/chalk/talc).
For the outside cladding (MA1):
  Creep-resistant mixtures (such as EVA, aluminum-oxyhydrate powder filling).

All of these materials exhibit specific insulating resistances of less than $10^{12}$ Ωcm and have dielectric constant values ($\epsilon r$) of $>3$.

By contrast, unsuitable cladding materials include polyolefins because of their extremely high insulating resistance and their especially low dielectric constant value ($\epsilon r$).

Since, however, the outside surface of the cladding KM must always be creep-resistant to withstand residual charges, all moisture-absorbing materials in the region of the cable core KS are to be preferably provided with a creep-resistant outside cladding that is likewise humidity-dependent. In this context, aluminum hydroxide is expediently mixed to the outside cladding material in the region of the outside cladding, preferably in a range between 10 and 60 percent by weight. Coatings of polyamides or polyurethanes having such a cladding laced with aluminum hydroxide are especially reliable in both mechanical and electrical terms.

Figure 1:
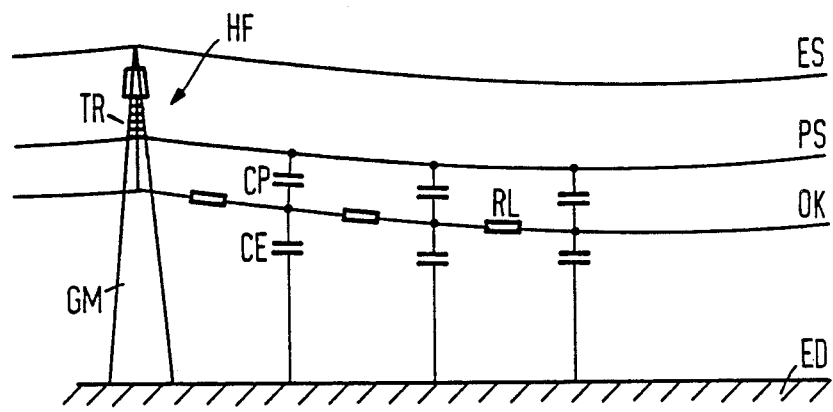
FIG. 1, as discussed above, shows a high-tension overhead line and self-bearing optical cable, as well as an equivalent electrical circuit.

In a cable OK of the present invention, the grounding region can be critical, in other words, the region at which the cable OK is clipped to grounded portions, such as in the region of the cross arm TR in FIG. 1. Since the full grounding current would flow off through the capacitance CS of FIG. 2 of a guying coil AS, it is expedient to provide a bleeder resistor RS in this region. The bleeder resistor RS has as low an impedance as possible. To achieve this, special grounding measures are also provided in the region of the core KS by, for example, conductive clips, wire windings or the like extending through the cladding KM. The same measures are also provided at the end of the cable OK, where grounding of the tower GM is likewise undertaken. Although the anticipated currents are less than 1 mA, it now becomes impossible to have a shock effect on persons.

Figure 4:
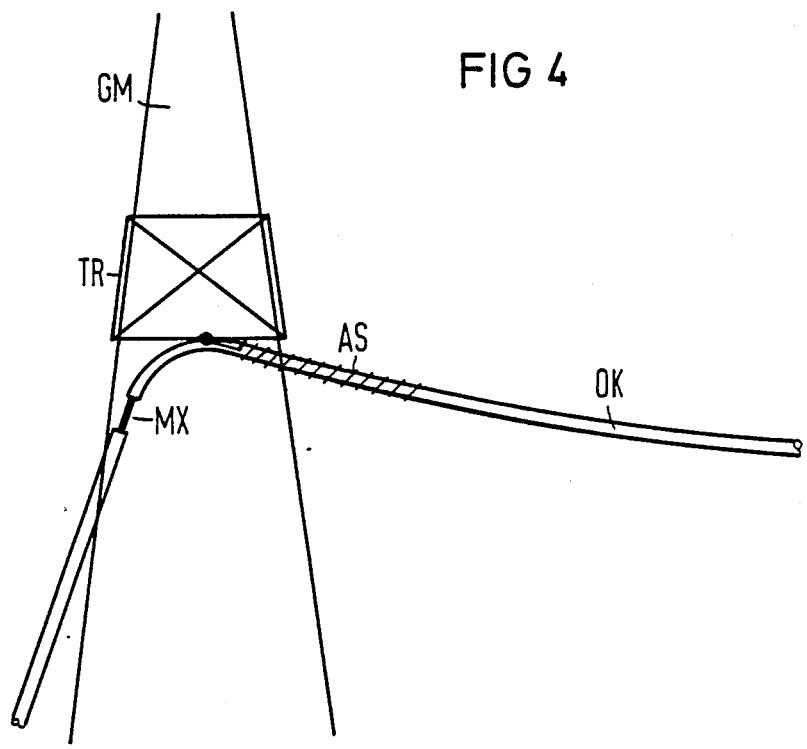
FIG. 4 is a diagrammatic side elevation showing the guying of the present optical cable at a tower.
Figure 5:
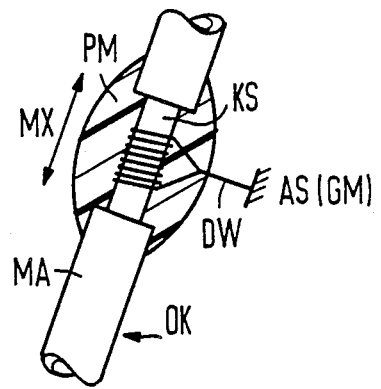
FIG. 5 is an elevation, partially in cross-section, showing the grounding of the present cable core.

FIG. 4 shows details for the grounding of the cable core KS in the region of the lattice tower GM. A subportion MX of the cladding, designated here as MA, of the optical cable OK is stripped as shown in FIG. 5 and the exposed cable core KS has wound therearound a metal wire DW. Alternately, a clip can be provided. The metal wire DW is conductively connected to the guying coil AS and/or to the lattice tower GM. Subsequently, the stripped location MX of the optical cable OK is resealed by a sealing compound PM for longitudinal water tightness of the cable OK. As provided in FIG. 3, it must also be considered that light waveguides LW accommodated in a double-wall inside tube IT1 and IT2 are normally embedded in a filling compound which yields longitudinal water tightness.

Although modifications and changes may be suggested by those skilled in the art, it is the intention of the inventor to embody within the patent warranted hereon all changes and modifications as reasonably and properly come within the scope of his contribution to the art.

I claim as my invention:

1. A metal-free, self-beariang optical cable for use as an overhead cable of a high-tension overhead line, comprising:
    a cable core of slightly electrically conductive material, said core having a resistivity of between $10^5$ ohm cm and $10^{10}$ ohm cm;
    a cable cladding covering said cable core; and
    said cable being strung in the field region between phase wires of the overhead high tension line, said cable being held by and clipped to grounded portions of a lattice tower.

2. A metal-free, self-bearing optical cable as claimed in claim 1, wherein said cable cladding is formed of slightly electrically conductive material, said cable cladding having a resistivity of between $10^7$ $\Omega$cm and $10^{12}$ $\Omega$cm.

3. A metal-free, self-bearing optical cable as claimed in claim 1, wherein said optical cable has an overall insulating resistance of between $10^{12}$ $\Omega$/m and $10^7$ $\Omega$/m.

4. A metal-free, self-bearing optical cable for use as an overhead cable in a field region between and outside of phase wires of a high-tension overhead line, comprising:
    a cable core of slightly electrically conductive material, said core having a resistivity of between $10^5$ ohm cm and $10^{10}$ ohm cm; and
    a cable cladding covering said cable core;
    wherein said cable core and said cable cladding are formed of moisture absorbing materials.

5. A metal-free, self-bearing optical cable for use as an overhead cable in a field region between and outside of phase wires of a high-tension overhead line, comprising:
    a cable core of slightly electrically conductive material, said core having a resistivity of between $10^5$ ohm cm and $10^{10}$ ohm cm; and
    a cable cladding covering said cable core;
    wherein said cable core and said cable cladding are of a material having an additive of aluminum hydroxide.

6. A metal-free, self-bearing optical cable as claimed in claim 5, wherein said aluminum hydroxide additive is between 10 and 60 percent by weight.

7. A metal-free, self-bearing optical cable as claimed in claim 1, further comprising:
    grounding devices for said optical cable, said grounding devices being provided at said cable core and at said cable cladding.

8. A metal-free, self-bearing optical cable as claimed in claim 7, wherein said cable cladding is stripped from said cable core at grounding locations at which said grounding devices are applied to said cable core, and
    further comprising: a sealing compound at said grounding locations for sealing.

9. A metal-free, self-bearing optical cable as claimed in claim 1, wherein said cable core includes plastic filaments.

10. A metal-free, self-bearing optical cable as claimed in claim 9, wherein said plastic filaments are mixed with glass filaments.

11. A metal-free, self-bearing optical cable as claimed in claim 1, wherein said cable core includes polyamide filaments.

12. A metal-free, self-bearing optical cable as claimed in claim 11, wherein said polyamide filaments are mixed with glass filaments.

13. A metal-free, self-bearing optical cable as claimed in claim 1, wherein said cable core includes polyester filaments provided with an ionogenic slip.

14. A metal-free, self-bearing optical cable as claimed in claim 1, wherein said cable core includes glass filaments provided with an ionogenic slip.

15. A metal-free, self-bearing optical cable for use as an overhead cable in a field region between and outside of phase wires of a high-tension overhead line, comprising:
    a cable core of slightly electrically conductive material, said core having a resistivity of between $10^5$ ohm cm and $10^{10}$ ohm cm; and
    a cable cladding covering said cable core;
    wherein said cable core includes filaments enhanced with swelling powders.

16. A metal-free, self-bearing optical cable for use as an overhead cable in a field region between and outside of phase wires of a high-tension overhead line, comprising:
- a cable core of slightly electrically conductive material, said core having a resistivity of between $10^5$ ohm cm and $10^{10}$ ohm cm; and
- a cable cladding covering said cable core;

wherein said cable core includes filaments enhanced by aluminum hydroxide.

17. A metal-free, self-bearing optical cable as claimed in claim 1, wherein said cable core includes filaments enhanced by ionogenic layers.

* * * * *